Aug. 24, 1954     W. T. FERGUSON     2,687,146
BELLOWS FOR RADIATOR VALVES
Filed Nov. 17, 1950
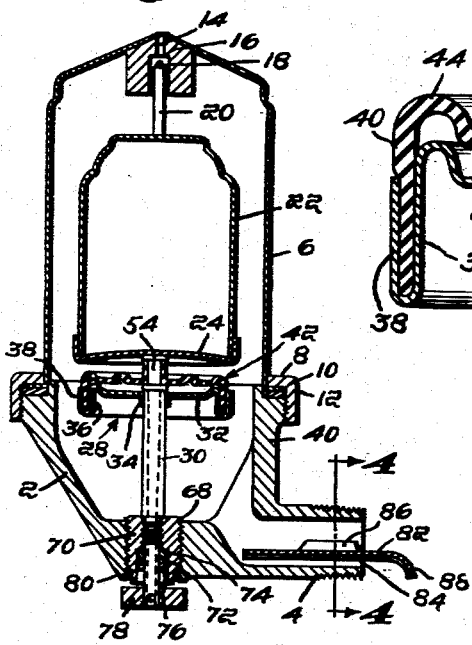
Fig. 1.
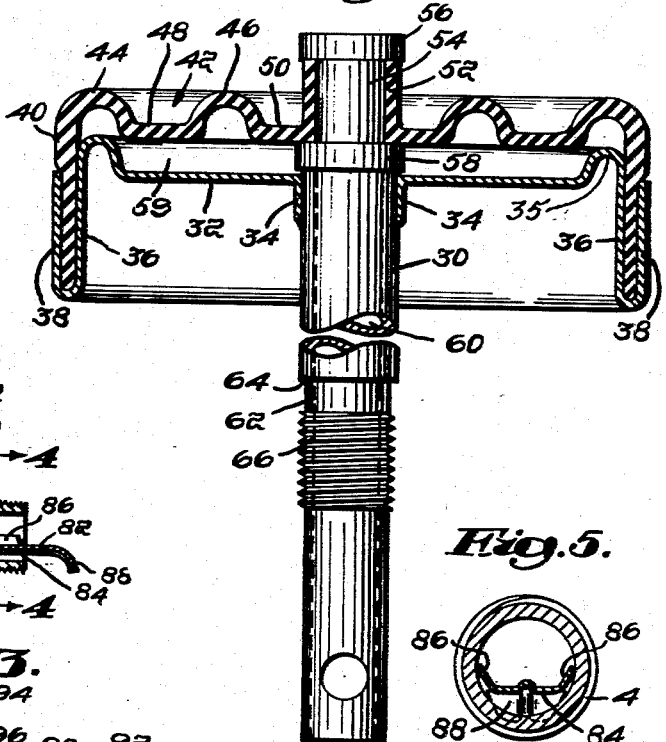
Fig. 2.
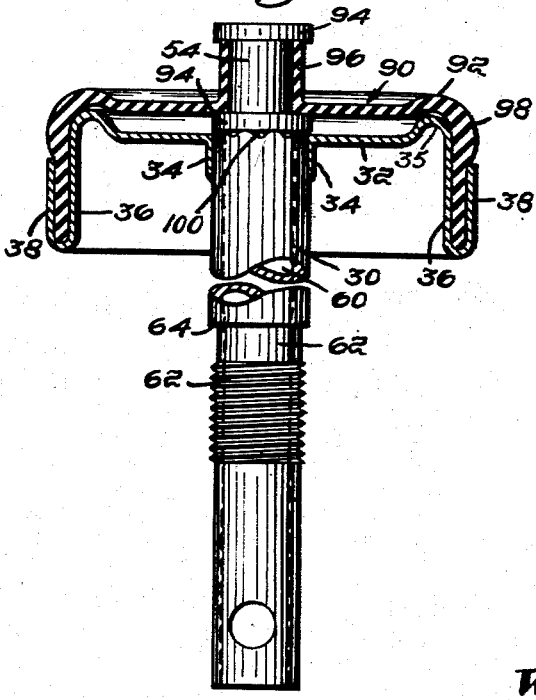
Fig. 3.
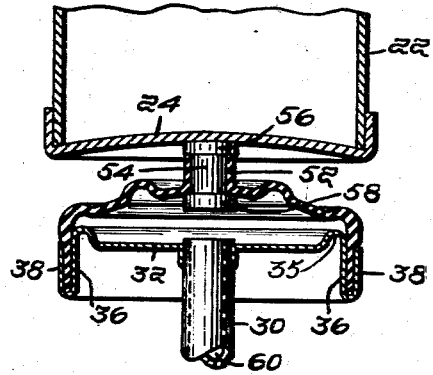
Fig. 5.
Fig. 4.
*Inventor:*
*Warren T. Ferguson,*
*by C. Yardley Chittick*
          *Attorney*

Patented Aug. 24, 1954

2,687,146

UNITED STATES PATENT OFFICE 2,687,146

BELLOWS FOR RADIATOR VALVES

Warren T. Ferguson, Newton Highlands, Mass., assignor to Anderson Products, Incorporated, Cambridge, Mass., a corporation of Massachusetts Application November 17, 1950, Serial No. 196,307

6 Claims. (Cl. 137—784)

This invention relates to air venting valves of the type commonly used in steam heating systems.

As is well understood in the heating industry, it is necessary in steam heating systems to have valves on the radiators to vent air therefrom in order that the steam from the boiler may reach and fill the radiator. Such valves have been in use for a long period and a valve of the character in question and an explanation of its use and operation is shown in detail in the patent to Lasher et al., No. 2,163,909 of June 27, 1939, for Air Venting and Vacuum Maintaining Valve.

It will be noted in the Lasher patent that the bellows structure used to maintain the valve closed under negative pressure conditions is in the form of an expansible metallic bellows of a substantial vertical dimension. One of the principal objects of the present invention is to provide a bellows of new and novel character which may be used in place of metallic expansible bellows of the type shown in the said Lasher patent. The bellows of the present invention is of small vertical dimension, inexpensive to manufacture, has long life and characteristics which insure that it will not become inoperative during periods of non-use.

Another object of the present invention is to provide a bellows structure which includes adjustable supporting mechanism that adapts it for easy installation and adjustment at the factory to provide proper operating characteristics when installed in the heating system.

These and other objects of the invention will become more apparent as the description proceeds with the aid of the accompanying drawings in which:

Fig. 1 is a sectional elevation of a vacuum type air venting valve incorporating my novel bellows and supporting mechanism.

Fig. 2 is a cross sectional elevation on an enlarged scale of the bellows structure with the supporting stem broken away in part.

Fig. 3 is a view similar to Fig. 2 of a modified form of bellows.

Fig. 4 is a section showing the bellows in expanded condition.

Fig. 5 is a section on an enlarged scale on the line 4—4 of Fig. 1 showing a detail of the siphon tongue.

Referring to Fig. 1, the valve in which the invention is incorporated comprises a base 2 having a conventional threaded nipple 4 extending laterally from the bottom. A cover or shell 6 is mounted on the base in the usual manner utilizing the lower flange 8 of the shell in conjunction with an inwardly flanged nut 10 which draws the flange 8 downwardly to engage a sealing ring 12, thus rendering the joint air and water tight.

An aperture 14 leading from the interior of the valve to the atmosphere has at its lower end a valve seat 16 adapted to be engaged by a suitable valve 18. Valve 18 is on the upper end of valve stem 20 which is carried on the upper end of a thermostatic float 22 of conventional construction. The float has a flexible diaphragm 24 at its lower end which is adapted to snap downwardly under expansion of gas within the float caused by application of sufficient heat.

In normal position, when the valve is cold and open, diaphragm 24 is contracted and rests on the bellows which is generally referred to at 28. The bellows in turn is carried by a hollow stem 30 and arranged in screw-threaded adjustment with base 2, the details of which will be explained hereinafter.

The bellows construction is as follows. The hollow supporting stem 30 has soldered to its upper end a circular diaphragm support 32, preferably of non-corrosive material which would ordinarily be sheet metal, such as copper, brass, or bronze capable of being formed to the shape desired. This support has had a hole punched downwardly through its center in such manner that the material is not removed but rather is turned downwardly in the form of a plurality of fingers 34 which facilitate the soldering of the diaphragm support to the stem 30. The outer periphery of the diaphragm support has a raised rim 35 which curves downwardly into a flange 36 and thence into a reversely upward-turned flange 38, the two flanges being spaced initially, at the time of manufacture, to receive in the groove formed thereby a corresponding downward turned flange 40 of a rubber diaphragm generally referred to at 42. When the term rubber is used, it will be understood that this contemplates any substance having rubber-like characteristics, whether made of natural or synthetic rubber, or of any of the current plastics or the like. This diaphragm 42 is circular in plan view and after the flange 40 has been placed in the groove formed by flanges 36 and 38 of the support, the latter parts are crimped together to secure permanently therebetween the rubber flange 40 in air and water tight engagement as shown in Fig. 2.

As can be seen in better detail in Fig. 2, diaphragm 42 is formed with an outer raised circular rim or ringlike portion 44 running about the entire circumference and a concentric inner raised rib or ringlike portion 46. These two raised portions are connected by an intermediate flat section 48, and a second flat section 50 extends inwardly from ring 46 terminating at a tubular central sleeve 52. In this sleeve is a rigid metallic button 54, preferably of a noncorrosive metal such as brass or copper. The button is prevented from sliding out of sleeve 52 by upper and lower flanges 56 and 58. The diaphragm 24, previously referred to, rests on the upper end of button 54 while the lower end of the button rests on the upper end of tube 30.

It will also be noted in Fig. 2 that the flange 40 of diaphragm 42 is thicker and hence stronger than the interior portions of the diaphragm. This increased thickness extends well into the ring portion 44. The purpose of this arrangement is to prevent lateral ballooning of the bellows when it is expanded by atmospheric pressure in a manner that will be described hereinafter.

It will also be noted that the horizontal portions of diaphragm 42 are spaced vertically as at 59 from the metallic support 32 so that during periods of inactivity in the heating system, as for example, the summer, there will be no chance of the rubber becoming stuck to the support to render the valve inoperative when the heating system recommences in the fall. As further insurance against adherence of the diaphragm 42 and support 32, the latter, prior to assembly, is nickel plated.

The hollow stem 30 extends downwardly through the base 2 permitting the atmosphere to reach the interior 59 of the bellows via the interior 60 of the stem.

Provision is also made for vertical adjustment of the stem. In Fig. 2 it can be seen that the stem is reduced in diameter at 62 forming a shoulder 64 with that part of the stem thereabove. The threads 66 engage with corresponding threads 68 on the interior of sleeve 70, shown in Fig. 1. Below the threads 68 is positioned a rubber sealing washer 72, set in a suitable recess 74 and held in position by a ring 76. A finger gripping button 78 engages the lower end of tube 30 in forced fit relation. The exterior of sleeve 70 is threaded and in engagement with corresponding threads at the bottom of base 2.

The various elements heretofore described are adjusted so that when the unit is cold and valve 18 open, as shown in Fig. 1, the valve may be closed by rotation of button 78 to the right, screwing stem 30 upwardly thereby moving float 22 and valve 18 upwardly a distance sufficient to engage valve seat 16. In order not to overstrain the parts, button 78 is set on stem 30 at a point which will cause it to engage the sleeve 70 or the surrounding part of base 2 just after valve 18 has closed.

When the button 78 is rotated to the left to move valve stem 30 downwardly to open valve 18, such movement is limited by the engagement of shoulder 64 with the top surface of sleeve 70. In this maximum open position, the amount of the opening between valve 18 and valve seat 16 will be such that upon elongation of float 22 as diaphragm 24 expands downwardly when heat is applied, valve 18 will engage firmly against valve seat 16, thereby closing the valve against escaping of steam. Initial adjustment of the parts to accomplish the foregoing results is made at the factory. The adjustments are made permanent by the introduction of solder 80 between the lower end of the sleeve and the bottom portion of the base.

The nipple 4, which is screwed into the radiator, has positioned therein a siphon tongue 82. This comprises a thin flat strip of metal 84 having a pair of upwardly turned wings 86 which frictionally engage the opposite interior walls of nipple 4. The outer end of the tongue is turned down as at 88, thereby facilitating the draining back into the radiator of any water that may accumulate in the base 2.

A modified construction of bellows is shown in Fig. 3. The construction of stem 30 and supporting diaphragm 32 is the same as that shown in Fig. 2 except that in this case the diameter is somewhat less as the unit is intended for use in a smaller valve. The rubber diaphragm, generally referred to at 90, differs from diaphragm 42 in that the intermediate ring is omitted. Thus, the outer raised ring 92 connects with the flat portion 94 which runs directly to sleeve 96. Sleeve 96 in turn receives the central rigid supporting button 54 the same as it was received by sleeve 52 in Fig. 2. Again it will be noted that the outer circumferential portion of diaphragm 90, indicated at 98, is thicker than the interior portion so that ballooning may be prevented.

The operation of the construction heretofore described is as follows. When the radiator is cold, the valve will be in the position shown in Fig. 1. As steam is generated in the boiler and flows to the radiator, the air in the radiator, because of the pressure of the steam, will move through the valve casing and out through port 14 to the atmosphere. In due course, steam will fill the radiator and move into the valve, raising the temperature of float 22 to a point where the volatile liquid in the float will vaporize and cause downward snap movement of diaphragm 24. This in turn causes valve 16 to be closed by valve stem 18 so that steam now being supplied to the radiator cannot escape.

After the temperature conditions of the room have been satisfied, the steam supply from the boiler will be discontinued. Thereafter, as the radiator temperature falls, the steam in the radiator will condense, producing a negative pressure in the radiator. At the same time, the temperature of float 22 will drop and when the critical temperature is reached, diaphragm 24 will snap upwardly thus tending to open valve 18. However, by the time this critical temperature is reached, the negative pressure in the interior of casing 6 will be so great that the atmospheric pressure, passing upwardly through the hollow supporting stem 30 to the space 59 between diaphragm support 32 and rubber diaphragm 42 will be adequate to force the rubber diaphragm upwardly to follow the upward collapse of diaphragm 24, thus continuously supporting valve 18 in closed position against valve seat 16. The expanded position of diaphragm 42, just referred to, is shown in the fragmentary section of Fig. 4.

It will be understood that when the bellows is in normal collapsed position, as in Figs. 1, 2 and 3, the flange 58 of button 54, while appearing to sit closely on the end of tube 30, does not seal the end of the tube because of the inaccuracies in the engaging surfaces which permit air to pass freely from tube 30 into space 59. If desired, the upper end of tube 30 may be notched, as indicated at 100 in Fig. 3 to insure against sealing. This, in addition to permitting free movement of air, also minimizes the possibility of button 54 sticking to the upper end of tube 30.

When the controlling thermostat again calls for heat so that steam is generated anew in the boiler, the negative pressure in the radiator and valve will be gradually eliminated. As the pressure approaches atmospheric, the diaphragm 42 will collapse and lower float 22 to cause reopening of valve 18 permitting atmospheric air to flow into the valve casing, thereby to reduce the pressure to atmospheric more quickly, and place the system in condition for venting the radiator air in the normal manner on this next cycle.

While the complete valve with which my invention is used, has been shown and its operation described, it will be understood that the invention resides only in the bellows and the supporting and adjusting structure related thereto.

It is my intention to cover all changes and modifications of the example of the invention herein chosen for purposes of the disclosure which do not constitute departures from the spirit and scope of the invention.

I claim:

1. A bellows for use in a steam radiator air venting valve comprising a stem with a passage therethrough, a circular rigid metal diaphragm support made of non-corrosive sheet metal affixed to the upper end of said stem and having a peripheral upwardly facing groove thereabout, a flexible rubber diaphragm overlying and spaced vertically from said diaphragm support and having a downturned outer flange positioned in said groove, the walls forming said groove exerting a compressive force on said outer flange thereby to secure said diaphragm flange in peripheral fluid-tight engagement with said support, said passage through said stem permitting flow of gas to the space between said support and said diaphragm, and a rigid member extending through said diaphragm at its center in alignment with said stem and in fluid-tight engagement with said diaphragm, said rigid member acting as a support for a superimposed element and preventing said diaphragm and said support from coming into contact with each other when said diaphragm is in normal collapsed condition.

2. A bellows for use in a steam radiator air venting valve comprising a stem with a passage therethrough, a circular rigid metal diaphragm support made of non-corrosive sheet metal affixed to the upper end of said stem and having a peripheral upwardly facing groove thereabout, with the height of the outer wall of said groove being greater than one-half the height of the inner wall, a flexible rubber diaphragm overlying and spaced vertically from said diaphragm support and having a downturned outer flange positioned in said groove, the walls forming said groove exerting a compressive force on said outer flange thereby to secure said diaphragm flange in peripheral fluid-tight engagement with said support, said passage through said stem permitting flow of gas to the space between said support and said diaphragm, and a rigid member extending through said diaphragm at its center in alignment with said stem and in fluid-tight engagement with said diaphragm, said rigid member acting as a support for a superimposed element and preventing said diaphragm and said support from coming into contact with each other when said diaphragm is in normal collapsed condition.

3. A bellows for use in a steam radiator air venting valve comprising a stem with a passage therethrough, a circular rigid metal diaphragm support made of non-corrosive sheet metal affixed to the upper end of said stem and having a peripheral upwardly facing groove thereabout, a flexible rubber diaphragm overlying and spaced vertically from said diaphragm support and having a downturned outer flange positioned in said groove, the walls forming said groove exerting a compressive force on said outer flange thereby to secure said diaphragm flange in peripheral fluid-tight engagement with said support, said passage through said stem permitting flow of gas to the space between said support and said diaphragm, and a rigid member extending through said diaphragm at its center in alignment with said stem and in fluid-tight engagement with said diaphragm, said rigid member comprising a short cylindrical element extending through said diaphragm and having spaced top and bottom flanges, the thickness of said bottom flange being approximately the distance between the under side of said diaphragm and the upper end of said stem when said diaphragm is in normal collapsed condition, said diaphragm having a central tubular sleeve extending therefrom to engage tightly said cylindrical element and to fill the space between said flanges thereby to provide said fluid-tight engagement, said rigid member acting as a support for a superimposed element and preventing said diaphragm and said support from coming into contact with each other when said diaphragm is in normal collapsed condition.

4. A bellows for use in a steam radiator air venting valve comprising a stem with a passage therethrough, a circular rigid metal diaphragm support made of non-corrosive sheet metal affixed to the upper end of said stem and having a peripheral upwardly facing groove thereabout, with the height of the outer wall of said groove being greater than one-half the height of the inner wall, a flexible rubber diaphragm overlying and spaced vertically from said diaphragm support and having a downturned outer flange positioned in said groove, the walls forming said groove exerting a compressive force on said outer flange thereby to secure said diaphragm flange in peripheral fluid-tight engagement with said support, said passage through said stem permitting flow of gas to the space between said support and said diaphragm, and a rigid member extending through said diaphragm at its center in alignment with said stem and in fluid-tight engagement with said diaphragm, said rigid member comprising a short cylindrical element extending through said diaphragm and having spaced top and bottom flanges, the thickness of said bottom flange being approximately the distance between the under side of said diaphragm and the upper end of said stem when said diaphragm is in normal collapsed condition, said diaphragm having a central tubular sleeve extending therefrom to engage tightly said cylindrical element and to fill the space between said flanges thereby to provide said fluid-tight engagement, said rigid member acting as a support for a superimposed element and preventing said diaphragm and said support from coming into contact with each other when said diaphragm is in normal collapsed condition.

5. A bellows for use in a steam radiator air venting valve comprising a stem with a passage therethrough, a circular rigid metal diaphragm support made of non-corrosive sheet metal affixed to the upper end of said stem and having a peripheral upwardly facing groove thereabout, a flexible rubber diaphragm overlying and spaced vertically from said diaphragm support and having a downturned outer flange positioned in said groove, the walls forming said groove exerting a compressive force on said outer flange thereby to secure said diaphragm flange in peripheral fluid-tight engagement with said support, said passage through said stem permitting flow of gas to the space between said support and said diaphragm, and a rigid member extending through said diaphragm at its center in alignment with said stem and in fluid-tight engagement with said diaphragm, said rigid member comprising a short cylindrical element extending through said diaphragm and having spaced top and bottom flanges, the thickness of said bottom flange being approximately the distance between the under side of said diaphragm and the upper end of said stem when said diaphragm is in normal collapsed condition, the top flange of said cylindrical element being at a level above the upper side of said diaphragm, said rigid member acting as a support for a superimposed element and preventing said diaphragm and said support from coming into contact with each other when said diaphragm is in normal collapsed condition.

6. A bellows for use in a steam radiator air venting valve comprising a stem with a passage therethrough, a circular rigid metal diaphragm support made of non-corrosive sheet metal affixed to the upper end of said stem and having a peripheral upwardly facing groove thereabout, a flexible rubber diaphragm overlying and spaced vertically from said diaphragm support and having a downturned outer flange positioned in said groove, the walls forming said groove exerting a compressive force on said outer flange thereby to secure said diaphragm flange in peripheral fluid-tight engagement with said support, said passage through said stem permitting flow of gas to the space between said support and said diaphragm, and a rigid member extending through said diaphragm at its center in alignment with said stem and in fluid-tight engagement with said diaphragm, said rigid member comprising a cylindrical element extending through said diaphragm and having spaced top and bottom flanges, said diaphragm having a central tubular sleeve extending upwardly therefrom to engage tightly said cylindrical element and to fill the space between said flanges thereby to provide said fluid-tight engagement, said rigid member acting as a support for a superimposed element and preventing said diaphragm and said support from coming into contact with each other when said diaphragm is in normal collapsed condition.

References Cited in the file of this patent

UNITED STATES PATENTS

| Number | Name | Date |
|---|---|---|
| 184,461 | Cooper | Nov. 21, 1876 |
| 1,132,009 | Hoffman | Mar. 16, 1915 |
| 1,252,267 | Hoffman | Jan. 1, 1918 |
| 1,885,457 | Lord et al. | Nov. 1, 1932 |
| 1,981,365 | Macdonald | Nov. 20, 1934 |
| 2,084,256 | Lasher | June 15, 1937 |
| 2,111,168 | Chansor | Mar. 15, 1938 |
| 2,125,262 | Hennecke | July 26, 1938 |
| 2,310,519 | Eskin | Feb. 9, 1943 |
| 2,338,495 | Davies | Jan. 4, 1944 |
| 2,537,308 | Hansen | Jan. 9, 1951 |